US006654383B2

United States Patent
Haymes et al.

(10) Patent No.: US 6,654,383 B2
(45) Date of Patent: Nov. 25, 2003

(54) MULTI-PROTOCOL AGILE FRAMER

(75) Inventors: Charles Louis Haymes, Wesley Hills, NY (US); Mark B. Ritter, Danbury, CT (US); Thomas Röwer, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/153,321

(22) Filed: May 22, 2002

(65) Prior Publication Data

US 2002/0191640 A1 Dec. 19, 2002

Related U.S. Application Data

(60) Provisional application No. 60/294,972, filed on May 31, 2001.

(51) Int. Cl.$^7$ .............................. H04J 3/16; H04J 3/24
(52) U.S. Cl. ........................................ 370/466; 370/474
(58) Field of Search .................................. 370/464, 465, 370/466, 469, 474, 503, 509, 510, 512, 546, 545; 709/200, 227, 230, 231, 232, 233, 236, 249

(56) References Cited

U.S. PATENT DOCUMENTS

| | | | | |
|---|---|---|---|---|
| 4,935,925 A | * | 6/1990 | Williams et al. ............ 370/428 |
| 5,428,614 A | * | 6/1995 | Shaver ........................ 370/394 |
| 5,533,018 A | * | 7/1996 | DeJager et al. ............. 370/352 |
| 5,568,471 A | * | 10/1996 | Hershey et al. ............. 370/245 |
| 5,613,096 A | * | 3/1997 | Danknick .................... 709/236 |
| 5,619,650 A | * | 4/1997 | Bach et al. .................. 370/469 |
| 5,696,899 A | * | 12/1997 | Kalwitz ...................... 370/254 |
| 5,826,018 A | * | 10/1998 | Vixie et al. ................. 370/469 |
| 5,842,039 A | * | 11/1998 | Hanaway et al. ............. 710/11 |
| 6,108,350 A | * | 8/2000 | Araujo et al. ............... 370/359 |
| 6,330,287 B1 | * | 12/2001 | Caso et al. .................. 370/464 |

* cited by examiner

*Primary Examiner*—Hassan Kizou
*Assistant Examiner*—David Odland
(74) *Attorney, Agent, or Firm*—Thu Ann Dang; Ryan, Mason & Lewis, LLP (57) ABSTRACT

A data framer capable of supporting at least two different data framing protocols potentially present in a source data stream includes two or more framing circuits and a controller coupled to the framing circuits. Each of the framing circuits is configured to extract user data from the source data stream in accordance with a different data framing protocol associated with the respective framing circuit. The controller is operative to: (i) receive the source data stream and automatically determine which of the at least two different data framing protocols corresponds to the source data stream; and (ii) route the source data stream to one of the first framing circuit and the second framing circuit in response to a match between the determined data framing protocol of the source data stream and one of the first and second data framing protocols.

16 Claims, 5 Drawing Sheets

MULTI-PROTOCOL AGILE FRAMER

CROSS-REFERENCE TO RELATED APPLICATIONS

This application claims the benefit of U.S. Provisional Application Ser. No. 60/294,972 filed on May 31, 2001, the disclosure of which is incorporated herein by reference.

FIELD OF THE INVENTION

The present invention relates generally to data transmission systems, and more particularly relates to a data framer that is capable of automatically supporting two or more data framing protocols.

BACKGROUND OF THE INVENTION

It is well known that data communication protocols, for transferring information between a source and a destination over a communication network, typically employ a framing architecture for synchronizing data between the source and destination. A data frame may be divided into various sections, including a message section and an information section (e.g., framing data) associated with the message section which is used, for example, to identify the frame boundaries and maintain the communication network path. The information section typically resides in a header and/or a trailer portion of the data frame. Different data communication protocols often utilize different frame organizations for sending data over the communication network.

A data framer is a device which generally functions in a data link layer of a data transmission system. When utilized at the receiver side of the system, the framer searches an incoming data stream for a data frame of a preset format or protocol. Once the frame boundaries have been identified using the preset protocol, valid user data is located within the frame by subsequent processing stages. On the transmit side, the framer organizes the user data into a frame corresponding to the preset protocol for transmission over the communication network.

Conventional framers are generally capable of processing only a single framing protocol. Since the conventional framer conducts all functions specifically for a selected protocol, received data streams that do not match the selected protocol will not be identified as valid. Likewise, transmitted data streams will only be framed in accordance with the single selected protocol. Additionally, there often exist variants of a given protocol for different data transmission rates. Framers are typically optimized for a targeted data rate. Thus, when the data rate changes, the framer settings must typically be manually modified to correspond to the selected protocol at the desired data rate.

It would be advantageous, therefore, to provide a framer that is capable of automatically supporting multiple framing protocols and/or data transmission rates.

SUMMARY OF THE INVENTION

The present invention provides techniques for forming a multi-protocol framer for use, for example, in a data transmission system. The multi-protocol framer is capable of automatically detecting a particular data transfer protocol in an input data stream received from a transmission medium, such as, for example, a fiber optic network. Once the particular protocol has been detected by the framer, the framer is configured to extract valid data from the input data stream and/or frame valid data for transfer over the transmission medium according to the detected protocol. Thus, using the techniques of the present invention, a data framer may be provided that is not only capable of automatically handling multiple data transfer protocols, but eliminates the need for knowing the protocol type a priori.

In accordance with one aspect of the invention, a data framer capable of supporting at least two different data framing protocols potentially present in a source data stream includes two or more framing circuits and a controller coupled to the framing circuits. Each of the framing circuits is configured to extract user data from the source data stream in accordance with a different data framing protocol associated with the respective framing circuit. The controller is operative to: (i) receive the source data stream and automatically determine which of the at least two different data framing protocols corresponds to the source data stream; and (ii) route the source data stream to one of the first framing circuit and the second framing circuit in response to a match between the determined data framing protocol of the source data stream and one of the first and second data framing protocols.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

The present invention provides techniques for forming a multi-protocol framer. The multi-protocol framer is described herein with specific reference to synchronous optical network (SONET)/synchronous digital hierarchy (SDH), Ethernet wide area network (WAN), Ethernet local area network (LAN), Fibre Channel WAN, and Fibre Channel LAN protocols for transferring data over a fiber optic network. It is to be appreciated, however, that the present invention is not limited to these or any particular data transmission protocols and/or communication mediums.

A detailed description of the SONET standard may be found, for example, in American National Standards Institute (ANSI) documents T1.105-1995, T1.105.02-1995, T1.105.04-1995 and T1.105.09-1996, which are incorporated herein by reference. The WAN synchronization standard may be found, for example, in ANSI T1TR3GPP 27.103-300, which is incorporated herein by reference. Likewise, an overview of LAN protocol standards may be found, for example, in International Organization for Standardization (ISO)/International Electrotechnical Commission (IEC) documents TR 8802-1:2001, ISO/IEC 10038-1993, Institute of Electrical and Electronics Engineers (IEEE) document 802.7-1989 and IEEE 802.1q-1998, which are incorporated herein by reference. The Fibre Channel protocol standard is described, for example, in the document "Fibre Channel—Physical and Signaling Interface" (ANSI X3.230-1994). Accordingly, a detailed description of these conventional data transfer protocols will not be presented herein.

In a data transmission system including a framer, one way to decide which framing format to use for transferring data between a source and a destination is to manually set the data transfer protocol from outside the framer. However, this has conventionally required a priori knowledge of the protocol used by the source. Moreover, whenever the protocol of an incoming data stream changes, control settings associated with the framer must also be manually changed to correspond to the incoming protocol in order to recognize the incoming data as being valid.

To enable a protocol change without manual interaction and without requiring a priori knowledge of the data framing protocol used by the source, the present invention provides techniques for automatically detecting the protocol of a received input data stream and locking to the framing architecture used by this protocol. Once the protocol has been determined on the receive side of the framer, the transmit side of the framer can be automatically set to correspond to the detected protocol. In this manner, a framer formed in accordance with the present invention is able to advantageously determine its own functionality without manual interaction. In addition, the data framer of the present invention may provide the ability to change the data framing protocol in response to a user-selectable control signal.

Figure 1:
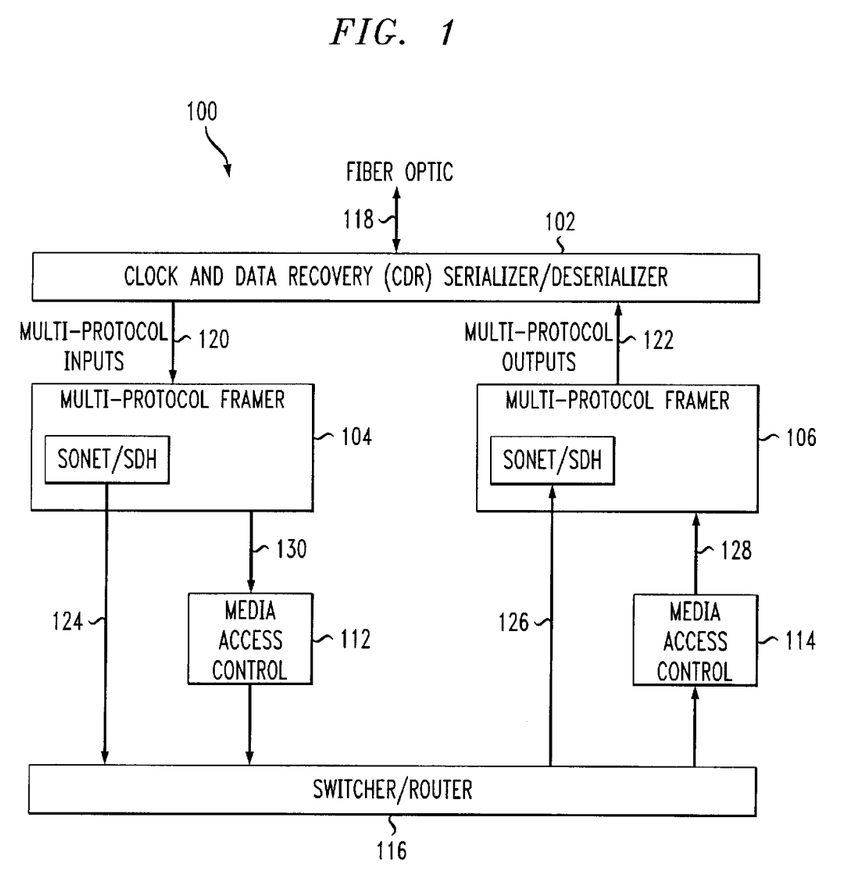
FIG. 1 is a block diagram illustrating a system integration of the multi-protocol agile framer, in accordance with the present invention.

FIG. 1 illustrates an exemplary data transmission system, formed in accordance with the present invention. The illustrative data transmission system 100 preferably includes clock and data recovery (CDR) circuitry 102, a pair of multi-protocol agile framers 104 and 106, a pair of media access controllers (MACs) 112 and 114, and a switcher/router 116. The CDR circuitry 102 is coupled to a transmission medium, such as, for example, a fiber optic network 118 for transferring data. The CDR circuitry 102 functions, at least in part, to operatively serialize and/or deserialize the incoming or outgoing data stream, respectively. On a receive side of the system, one of the framers 104 is operatively configured to receive an input data stream 120 from the CDR circuitry 102. The input data stream 120 may comprise data frames of one of a plurality of undetermined protocols. On the transmit side of the system, another of the framers 106 is operatively configured to send an output data stream 122 to the CDR circuitry 102. Like the input data stream 120, the output data stream 122 may comprise data frames of one of a plurality of protocols, and is preferably matched to the protocol of the input data stream.

One the receive-side, multi-protocol framer 104 is preferably configured to automatically detect the protocol of the input data stream 120 and extract valid data therefrom. Once the protocol has been determined, valid data can be easily located within a given frame corresponding to the detected protocol. Preferably, framer 104 includes a first output 124 for providing SONET/SDH-type data to the switcher/router 116 for transmission. Framer 104 also preferably includes a second output 130 for providing Ethernet/Fibre Channel-type data to the media access controller (MAC) 112, which is operatively coupled to the switcher/router 116. The MAC 112 functions, at least in part, to evaluate switch routing in the system.

On the transmit-side, multi-protocol framer 106 is preferably configured to receive either SONET/SDH-type data 126 directly from the switcher/router 116 or receive Ethernet/Fibre Channel-type data 128 from the switcher/router 116 via MAC 114. In either case, the data received from the switcher/router 116 is preferably framed by the transmit-side multi-protocol framer 106 using the protocol detected by the receive-side multi-protocol framer 104. The framed data is then sent to the CDR circuitry 102 as an output data stream 122 for transferring data to a destination via the fiber optic network 118.

Figure 2:
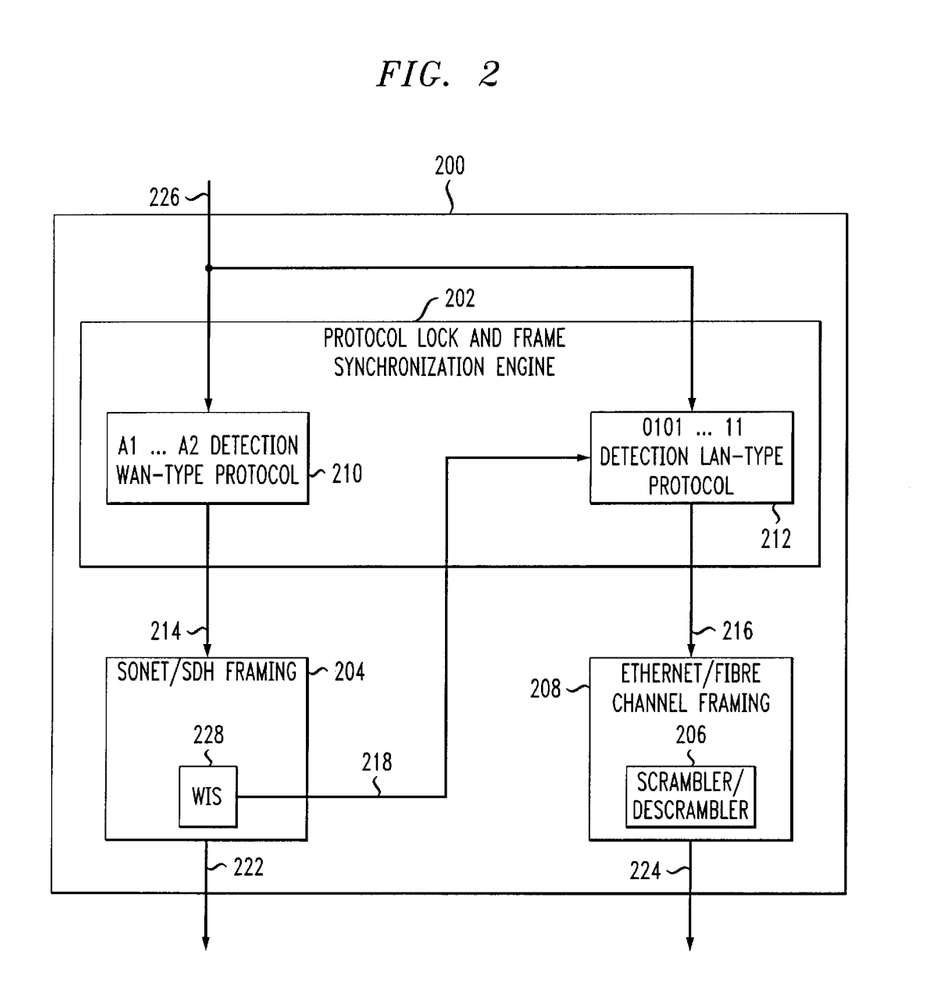
FIG. 2 is a block diagram illustrating a receive side multi-protocol framer, formed in accordance with one aspect of the present invention.

With reference now to FIG. 2, there is shown an illustrative multi-protocol agile framer configured for receive-side operation, in accordance with one aspect of the present invention. The multi-protocol framer 200 is preferably organized into several functional blocks for ease of explanation, including a Protocol Lock and Frame Synchronization Engine 202, a SONET/SDH framing block 204 and an Ethernet/Fibre Channel framing block 208. It is to be appreciated that each of these functional blocks may be implemented by individual circuitry corresponding thereto, such as, for example, a digital signal processor (DSP) or alternative processing device. Alternatively, a single circuit may be used to implement more than one functional block. Moreover, the present invention contemplates that one or more functional blocks associated with the framer may be implemented in software running on a processor, hardware, or a combination of software and hardware, as will be understood by those skilled in the art.

The Protocol Lock and Frame Synchronization Engine 202 preferably receives an input data stream 226 presented thereto, for example, from a fiber optic network, and searches for a frame synchronization pattern in the input data stream. For example, for a WAN protocol, the data stream may include framing bytes A1 and A2, which indicate the beginning of a synchronous transport signal (STS) frame. Alternatively, in the case of a LAN protocol, the data stream may include a 01/10 bit sequence every 66 bits, indicating the beginning of a LAN-type data frame. The Protocol Lock and Frame Synchronization Engine 202 preferably includes two or more state machines 210 and 212, each of the state machines 210, 212 being configured to operatively detect a different predetermined protocol in the input data stream 226. The present invention contemplates that additional state machines (not shown) may be added to the Protocol Lock and Frame Synchronization Engine 202 for detecting additional data transfer protocols corresponding thereto in the input data stream, thus expanding the protocol detection capability of the framer.

The state machines 210, 212 preferably each receive the input data stream 226 and operate substantially in parallel, to essentially scan the input data stream and detect a data frame in accordance with predefined protocol standards associated therewith. By operating in parallel, the state machines 210, 212 are able to detect an undetermined protocol in the input data stream more quickly. Therefore, the speed of a data framer formed in accordance with the present invention is significantly improved. When one of the state machines detects a particular data frame corresponding to its configured protocol, that state machine may be referred to as being in an "in-frame" or "lock" condition, and the other state machine(s) may be disabled or otherwise shut off until the in-frame condition has ended. By disabling the unused state machine(s), power consumption in the framer may be reduced.

When the Protocol Lock and Frame Synchronization Engine 202 identifies the input data stream as being a WAN-type protocol, state machine 210, which is used in this instance for detecting a WAN-type protocol in the data stream 226, preferably generates a control signal indicating that it is in an in-frame condition. The in-frame control signal generated by state machine 210 may be used to operatively disable state machine 212 and/or transfer the input data stream to subsequent processing circuitry associated with state machine 210. Once the protocol of the input data stream has been identified, the in-frame state machine (e.g., 210) preferably continues to periodically monitor the input data stream 226 to determine whether the in-frame condition still exists. It is to be appreciated that once the state machine is in an in-frame condition, indicating that the data transfer protocol is known, frame boundaries can be easily determined corresponding to the detected protocol. Thus, to determine whether the in-frame condition still exists, the state machine need only monitor the input data stream for the expected frame boundaries, as will be understood by those skilled in the art.

State machine 210 transfers the input data stream, which has been previously identified as being a WAN-type protocol, to the SONET/SDH framing block 204 via line 214. The SONET/SDH framing block 204 preferably determines whether the incoming data stream is a SONET/SDH protocol or a WAN interface sublayer (WIS) protocol, defined by the SONET/SDH standard and WIS standard (e.g., ANSI T1.416-1999, which is incorporated herein by reference), respectively, as known by those skilled in the art. To accomplish this, the SONET/SDH framing block 204 may be configured to detect one or more predetermined byte locations in the input data stream. For example, the SONET/SDH framing block 204 may operatively detect certain overhead bytes which are utilized in the SONET/SDH protocol, but which are unused and set to a particular logic level, such as, for example, logic zero, in the WIS protocol. It is to be appreciated that alternative techniques for identifying a particular protocol or differentiating between two or more protocols in the input data stream may be employed, in accordance with the invention.

When the incoming data stream 214 to the SONET/SDH framing block 204 is determined to be a purely SONET/SDH protocol, the SONET/SDH framing block 204 preferably transfers the data stream directly to subsequent processing circuitry (e.g., switcher/router 116 in FIG. 1), for example, via line 222. Alternatively, when the data stream 214 is not recognized as a SONET/SDH protocol, a WIS block 228 included in the SONET/SDH framing block 204 preferably transfers the data stream to state machine 212 via line 218 for further processing. Since a WIS frame essentially contains a plurality of Ethernet/Fibre Channel frames, the WIS data stream 218 can be further processed in accordance with a LAN-type protocol.

When the Protocol Lock and Frame Synchronization Engine 202 identifies the input data stream 226 as being a LAN-type protocol, state machine 212 preferably generates an in-frame control signal. The in-frame control signal generated by state machine 212 may be used in a manner consistent with state machine 210, as previously described, to operatively disable state machine 210, along with any unused circuitry associated therewith (e.g., SONET/SDH framing block 204), and/or route the data stream to subsequent processing circuitry associated with state machine 212. As previously described, once the protocol of the input data stream 226 has been identified, the in-frame state machine (e.g., 212) preferably continues to periodically monitor the data stream to determine whether the in-frame condition still exists.

State machine 212 operatively routes the data stream, which has already been determined to be a LAN-type protocol, to a scrambler/descrambler 206 included in the Ethernet/Fibre Channel framing block 208. The scrambler/descrambler 206 is preferably configured to extract payload and overhead fields within the incoming frame which has been previously scrambled in order to provide sufficient bit transitions (e.g., zero-to-one or one-to-zero) in the data stream. As will be understood by those skilled in the art, in fiber optic systems employing a receiver phase lock loop, the data stream must generally be encoded to include a predetermined number of bit transitions in order to allow the receiver phase lock loop to recover a clock signal from the received data with low jitter. As previously stated, since a WIS frame essentially contains a plurality of Ethernet/Fibre Channel frames, the WIS data stream 218 can be further processed by the Ethernet/Fibre Channel framing block 208. The scrambler/descrambler 206 may additionally provide data encoding/decoding for error detection and/or correction purposes. For example, in a LAN-type protocol, for every 66 bits of data received there is only 64 bits of real data. Thus, the descrambler is preferably configured to transpose the 66-bit data stream 216 into a 64-bit data stream 224 (e.g., using a 66-bit/64-bit decoder).

The Ethernet/Fibre Channel framing block 208 preferably determines whether the incoming data stream 216 is an Ethernet protocol or a Fibre Channel protocol, as defined by the Ethernet and Fibre Channel standards, respectively. The Ethernet/Fibre Channel framing block 208 may be configured to differentiate between Ethernet and Fibre Channel protocols using various techniques, such as, for example, ordered set signaling, start-of-file (SOF) and end-of-file (EOF) recognition, and open fiber control (OFC) signaling, as will be explained in further detail below. Alternative protocol differentiation techniques suitable for use with the present invention are similarly contemplated.

As will be understood by those skilled in the art, ordered sets, in the context of a Fibre Channel protocol, are four-byte transmission words containing data and special characters as a first transmission character. An ordered set may be, for example, a frame delimiter, a primitive signal, or a primitive sequence. Ordered sets are used, at least in part, to distinguish Fibre Channel control information from data and provide the availability to obtain bit and word synchronization, which also establishes word boundary alignment. Frame signaling (FSIG) in accordance with IEEE Standard 802.3ae is used to signal an ordered set of Fibre Channel code, and always begins with special character K28.2. The special character K28.2 in the byte0 position of the ordered set will always indicate Fibre Channel ordered set data, such as, for example, K28.2-Dx1.y1-Dx2.y2-Dx3.y3, and is then translated back into the proper Fibre Channel ordered set, for example, K28.5-Dx1.y1-Dx2.y2-Dx3.y3.

Another technique for distinguishing between Ethernet and Fibre Channel protocols is SOF and EOF recognition. Frame delimiters SOF and EOF immediately precede and follow, respectively, the contents of a given frame. SOF and EOF are handled differently in Ethernet and Fibre Channel. For instance, Fibre Channel utilizes specific ordered sets for both SOF and EOF. Alternatively, Ethernet utilizes only a single control character for SOF and EOF. Moreover, since the Fibre Channel protocol employs ordered sets of four bytes, the control characters for delimiters SOF and EOF will always reside in the same byte position. In the Ethernet protocol, however, only the SOF character resides in the same byte position, and the EOF character may reside in any byte position. These differences are set forth, for example, in the 10 Gigahertz (GHz) Fibre Channel standard document version 1.0, section 14, pp. 53ff (Mar. 10, 2001) and the 10 GHz Ethernet standard document IEEE 802.3ae, Draft 2.3, section 48.3, pg. 296ff, which are incorporated herein by reference.

More specifically, the bytes exiting a 66-bit/64-bit decoder (not shown) residing in Ethernet/Fibre Channel framing block 208 are preferably compared with expected SOF and/or EOF characters specific to the Ethernet protocol and the Fibre Channel protocol substantially simultaneously. When a Fibre Channel ordered set with proper SOF and EOF control character alignment and/or ordered set sequence is detected, a state machine included in the Ethernet/Fibre Channel framing block 208 preferably begins counting data packets with proper SOF and EOF termination up to a user-definable count to assure no chance of false Fibre Channel detection. If Fibre Channel sets are not detected, or if EOF control characters are detected in wrong or otherwise unexpected byte positions in the data stream for a Fibre Channel protocol, then Ethernet data is presumed. In this instance, an Ethernet-specific state machine preferably searches for SOF characters in the proper byte location and begins counting properly formatted Ethernet packets up to a user-definable maximum count.

The present invention preferably utilizes the above-described maximum count to provide hysteresis in the protocol determination process, such that the framer is less susceptible to "glitches" caused by single packet errors in the data stream, and/or other anomalies. Various techniques can be employed for providing such hysteresis, in accordance with the present invention. For example, a "valid packet" counter (not shown) may be included in the Ethernet/Fibre Channel framing block 208. The valid packet counter may be initialized to a predetermined count. If, after some time, the Ethernet or Fibre Channel SOF and/or EOF formatting is found to be in error, the count associated with the valid packet counter is either incremented or decremented by one such that a single packet error does not cause the Ethernet/Fibre Channel determination process to undesirably "glitch" or switch to using another protocol. A comparator (not shown) may be used in conjunction with the valid packet counter for comparing the counter value with a predetermined count value in order to determine whether the protocol should be changed (e.g., an unacceptable number of packet errors were detected), as will be understood by those skilled in the art. If no protocol is found which provides a sufficiently low error rate, the framer may, in accordance with the invention, indicate a loss of link (LOL) in a manner determined by the standard associated with the particular protocol or by the user.

It is to be appreciated that there are various alternative methods that may be used to implement the protocol determination and switching functions of the present invention. For example, in accordance with another aspect of the invention, the Ethernet/Fibre Channel framing block 208 may first look for an Ethernet protocol, rather than a Fibre Channel protocol. To accomplish this, the Ethernet/Fibre Channel framing block 208 may be configured to detect the variable EOF control character location. Alternatively, SOF and Ethernet preamble characters may be used to define a unique pseudo-ordered set which is different from the SOF ordered set definitions corresponding to a Fibre Channel protocol.

An OFC signaling technique may also be utilized in accordance with the present invention to discriminate between an Ethernet protocol and a Fibre Channel protocol, as previously stated. The OFC signaling technique, which may be employed in the CDR circuitry 102 of the data transfer system 100 (see FIG. 1), relies on OFC employed in setting up 850 nanometer (nm) wavelength division multiplexing (WDM) Fibre Channel links for transporting several data streams over a single fiber. For example, for an OFC function, Fibre Channel links may employ a signal generated by high-speed front-end circuitry which is processed by OFC circuitry in the CDR circuitry 102 to generate a laser enable signal (e.g., Laser_En). The laser enable signal may be a high logic level when the high-speed front-end circuitry detects a signal, as will be understood by those skilled in the art. Since neither Ethernet nor SONET protocols utilize this signal, any link where the laser enable signal goes to a high logic level would automatically be considered a Fibre Channel link.

Figure 3:
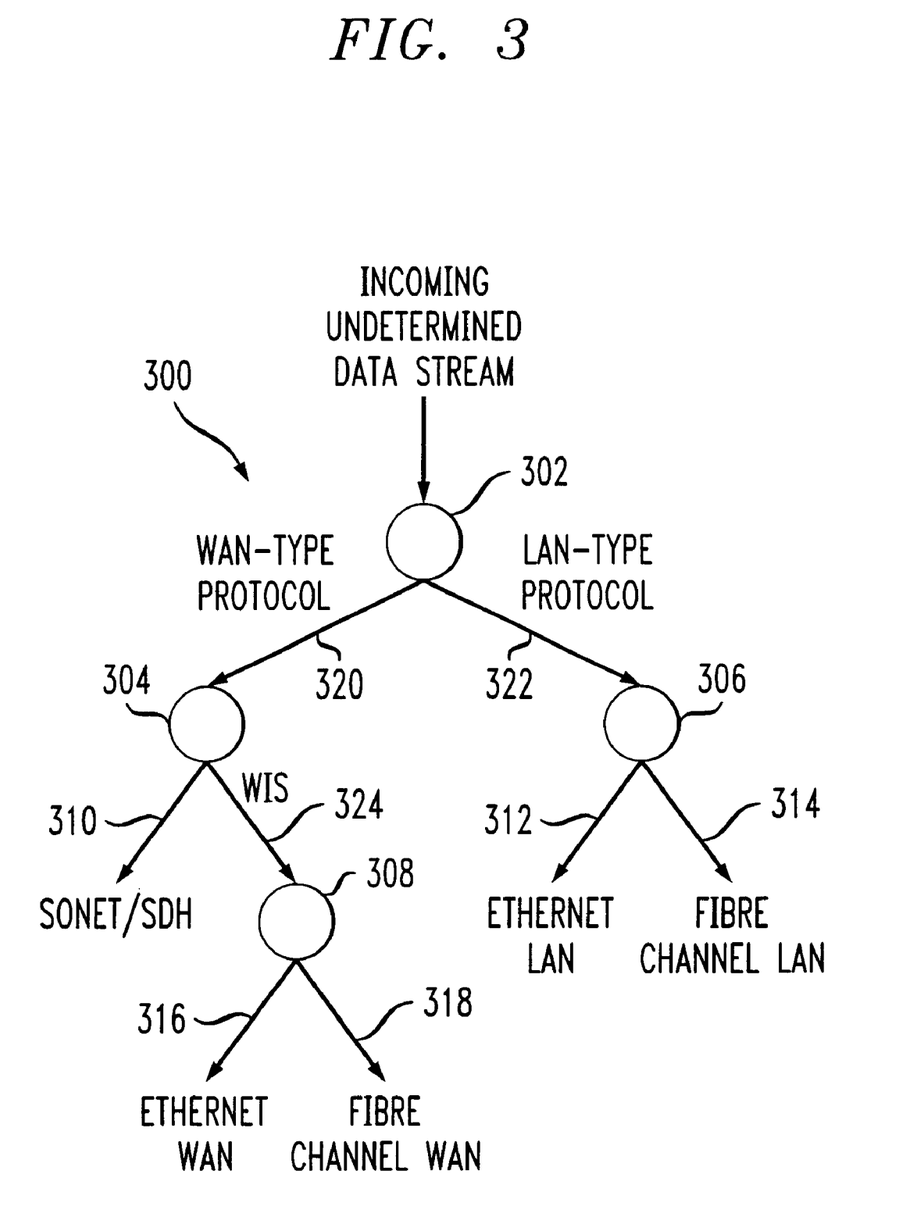
FIG. 3 is a block diagram illustrating an exemplary decision tree utilized by the illustrative multi-protocol framer of FIG. 2 for determining the protocol of the incoming data stream, in accordance with the present invention.

By way of example only, FIG. 3 depicts an illustrative decision tree 300 utilized by the multi-protocol framer of FIG. 2 for determining the protocol of the incoming data stream, in accordance with the present invention. As previously described, the incoming data stream is determined to be either a WAN-type protocol or a LAN-type protocol at node 302. When a WAN-type protocol is detected, the framer routes the WAN-type protocol data stream 320 to node 304. Node 304 determines whether data stream 320 is a SONET/SDH protocol or a WIS protocol. When a SONET/SDH protocol is detected, SONET/SDH data stream 310 is routed to a predetermined destination. Similarly, when node 304 determines that data stream 320 is a WIS protocol, WIS protocol data stream 324 is routed to node 308 for further processing. Node 308 operatively determines whether data stream 324 is an Ethernet protocol or a Fibre Channel protocol. Since the data stream received at node 308 was previously determined to be a WAN-type protocol, node 308 will output either an Ethernet WAN protocol data stream 316 or a Fibre Channel WAN protocol data stream 318 to respective predetermined destinations.

When node 302 determines that the incoming data stream is a LAN-type protocol, the LAN-type protocol data stream 322 is routed to node 306 for further processing. Node 306 operatively determines whether data stream 322 is an Ethernet protocol or a Fibre Channel protocol. Since the data stream received at node 306 was previously determined to be a LAN-type protocol, node 306 will output either an Ethernet LAN protocol data stream 312 or a Fibre Channel LAN protocol data stream 314 to respective predetermined destinations. It is to be appreciated that nodes 306 and 308 each function, at least in part, to differentiate between Ethernet and Fibre Channel protocols in a given input data stream. Therefore, nodes 306 and 308 may be implemented by the same or similar functional blocks (e.g., block 208 in FIG. 2).

As the number and/or type of protocols handled by the multi-protocol framer of the present invention changes, the decision tree 300 will change accordingly to correspond thereto. A decision tree may also be defined for a multi-protocol framer that is configured for transmit-side operation in a manner consistent with the decision tree 300 shown in the figure, as will be understood by those skilled in the art.

Figure 4:
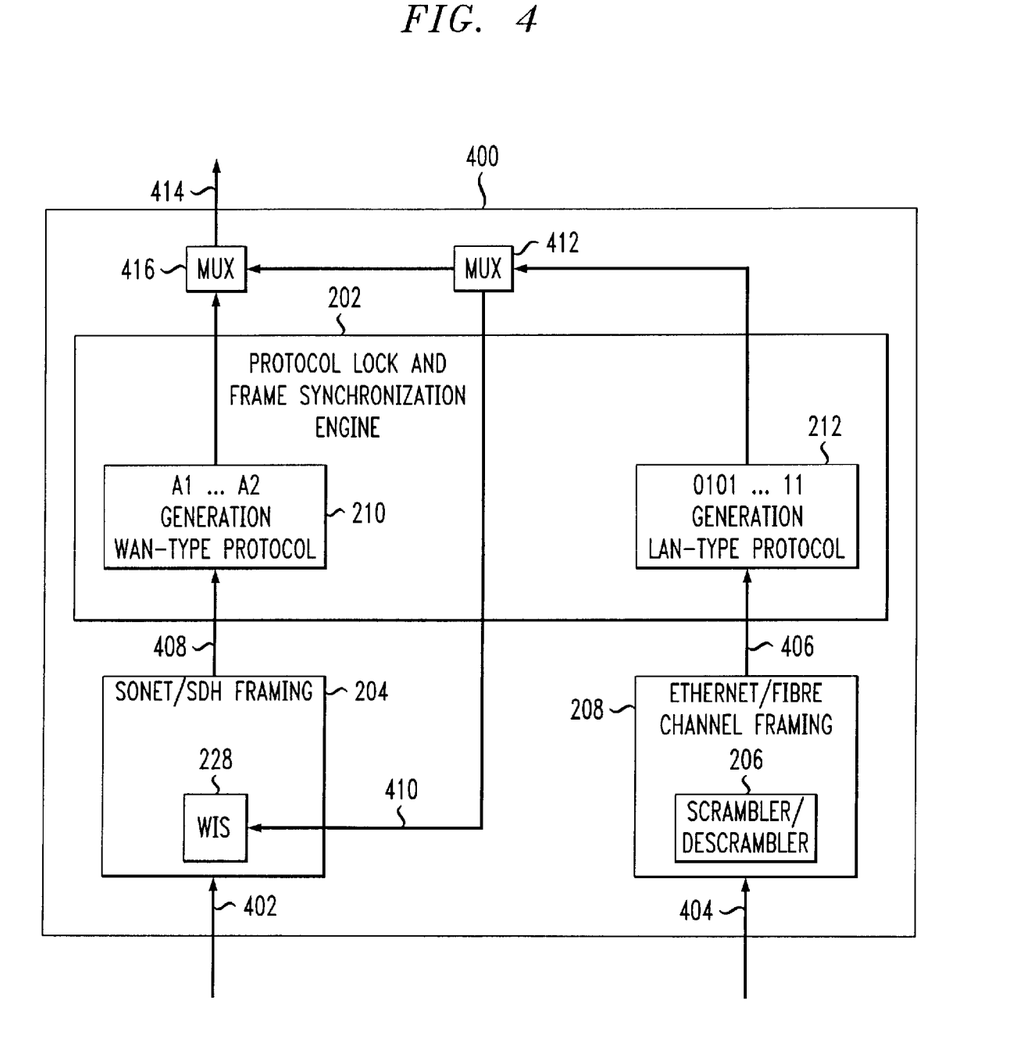
FIG. 4 is a block diagram illustrating a transmit side multi-protocol framer, formed in accordance with the present invention.

With reference now to FIG. 4, there is shown an illustrative multi-protocol agile framer 400 configured for transmit-side operation, in accordance with the present invention. The multi-protocol framer 400, like the receive-side multi-protocol framer shown in FIG. 2, includes a Protocol Lock and Frame Synchronization Engine 202, a SONET/SDH framing block 204 and an Ethernet/Fibre Channel framing block 208. It is to be appreciated that each of these functional blocks may be implemented by individual circuitry corresponding thereto, such as, for example, a digital signal processor (DSP). Alternatively, a single circuit may be used to implement more than one functional block. Moreover, the present invention contemplates that one or more functional blocks associated with the framer may be implemented in software running on a processor, hardware, or a combination of software and hardware, as will be understood by those skilled in the art.

During a transmit operation, the multi-protocol framer 400 is preferably configured to receive, although not necessarily concurrently, at least one of a first data stream 402 originating from a SONET/SDH source and a second data stream 404 originating from an Ethernet/Fibre Channel source. The first data stream 402 is routed to SONET/SDH framing block 204 which operatively processes the received data and generates a SONET/SDH protocol output data stream 408. A first state machine 210, included in the Protocol Lock and Frame Synchronization Engine 202, is preferably configured to process data in accordance with a WAN-type protocol. State machine 210 receives the SONET/SDH protocol data stream 408 and generates a WAN-type protocol frame for transmission to a predetermined destination via fiber optic network 414, or an alternative communications medium.

Data stream 404 originating from an Ethernet/Fibre Channel source is routed to Ethernet/Fibre Channel framing block 208 which operatively processes the received data and generates a Ethernet/Fibre Channel protocol output data stream 406. The Ethernet/Fibre Channel protocol data stream 406 is preferably encoded by a scrambler/descrambler 206 included in the Ethernet/Fibre Channel framing block 208 in order to provide sufficient bit transitions (e.g., zero-to-one or one-to-zero) in the data stream, a process known as "scrambling." As previously explained, in fiber optic systems employing a receiver phase lock loop, the data stream must generally be encoded to include a predetermined number of bit transitions in order to allow the receiver phase lock loop to recover the clock signal from the received data with reduced jitter.

When the destination protocol of source data stream 404 is a WAN-type protocol (e.g., as determined by the receive-side framer or by the source data stream itself), scrambler/descrambler 206 generates an encoded Ethernet/Fibre Channel protocol data stream which is preferably routed through a second state machine 212, included in the Protocol Lock and Frame Synchronization Engine 202, to WIS block 228 included in the SONET/SDH framing block 204. WIS block 228 processes the received data stream 410 in accordance with a WIS protocol and is further processed by the SONET/SDH block 204 to generate a SONET/SDH protocol output data stream 408. State machine 210 receives the SONET/SDH protocol data stream 408 and generates a WAN-type protocol frame for transmission to a predetermined destination via fiber optic network 414. A multiplexer (MUX) 412 may be included in the framer 400 for selectively routing the data stream output by state machine 212 to either the fiber optic network 414 or to the WIS block 228. A second MUX 416 may also be included for selectively routing either the LAN-type data stream (e.g., from state machine 212) or the WAN-type data stream (e.g., from state machine 210) to the fiber optic network 414.

When the destination protocol of source data stream 404 is a LAN-type protocol, the scrambler/descrambler 206 generates an encoded Ethernet/Fibre Channel protocol data stream 406 which is routed to the second state machine 212 included in the Protocol Lock and Frame Synchronization Engine 202. The second state machine 212 is preferably configured to process data in a LAN-type protocol. State machine 212 receives the encoded Ethernet/Fibre Channel protocol data stream 406 and generates an appropriate LAN-type protocol frame for transmission to a predetermined destination via fiber optic network 414. In this instance, the output data stream does not pass through the WIS block 228 for further processing.

It is to be appreciated that the protocol to be output during the transmit operation may be determined by a control signal (e.g., in-frame control signal), or other means, generated by a state machine associated with the receive-side framer, as previously described. Alternatively, the present invention contemplates that information regarding the destination protocol may be encoded into the incoming data stream received by framer 400, as will be understood by those skilled in the art. Additionally, the protocol used by the transmit-side framer 400 may be user-selectable.

Although the multi-protocol framer is depicted in the figures as including protocol-specific functional blocks corresponding to a particular protocol, one or more of these blocks may be shared by more than one protocol. For example, the scrambler/descrambler is preferably protocol-independent, and may therefore be used for each of the protocols received. Likewise, the encoder/decoder functions are substantially identical, except for minor variations, such as in mapping control ordered sets (e.g., in Fibre Channel protocol) or characters (e.g., in Ethernet protocol). Consequently, decoding and/or encoding of these protocols can be performed using the same hardware, with slight modifications thereto.

Advantageously, once the protocol of the incoming data stream has been determined, those functional blocks associated with the unused protocol can be powered down or otherwise disabled, thus significantly reducing overall power consumption in the framer. For example, the WIS frame overhead is a subset of the SONET/SDH overhead. Accordingly, at least a portion of the SONET/SDH functional blocks can be disabled when an Ethernet/Fibre Channel WAN data stream is received.

Since information regarding the protocol of the received data stream may be utilized for subsequent data processing (e.g., in a data link layer), the multi-protocol framer, in accordance with another aspect of the invention, is preferably configured to provide information associated with the detected protocol to enable, for example, further protocol-specific processing. This can be accomplished, for example, via a serial management interface, such as a multiplexed data input/output (MDIO)/multiplexed data clock (MDC) interface, or in-band if coded data is used at the interface. When all data to be transferred is in Internet Protocol (IP) format, the transmit side can be switched to the proper output format. IP data from different protocols can be operatively fed into one switch if a first-in first-out (FIFO) buffer, or an alternative buffering arrangement, is included at the switch input. Buffering enables the data framer to handle small deviations in the data rates of the incoming data stream. The acceptable deviations in the data rate for a given protocol may be set forth, for example, in the standard corresponding to the particular protocol used, as will be understood by those skilled in the art.

With regard to the CDR circuitry, as previously described in conjunction with FIG. 1, clock and data recovery of the incoming data stream must be done before the data originating from the fiber optic network is received by the framer. As shown in Table 1 below, the data rate is different for the various protocols described herein that can be recovered by the multi-protocol framer of the present invention.

TABLE 1

| Protocol | MAC Data Rate | XAUI Data Rate | Line Data Rate |
|---|---|---|---|
| SONET/SDH | n/a | n/a | 9.95328 |
| Ethernet WAN | 9.294196 | 4 × 3.125 | 9.95328 |
| Ethernet LAN | 10 | 4 × 3.125 | 10.3125 |
| Fibre Channel WAN | 9.294196 | 4 × 3.1875 | 9.95328 |
| Fibre Channel LAN | 10.2 | 4 × 3.1875 | 10.51875 |

In Table 1, the term "XAUI" refers to 10 Gigabit Attachment Unit Interface and all data rates are given in gigabits per second (Gbs). The CDR circuitry must be configured to lock to any frequency within this range in order for the framer to function properly. Moreover, if additional protocols and/or data rates are included in the multi-protocol framer, the CDR circuitry must be configured to cover these additional frequencies as well.

There are various approaches which can be employed to insure that the CDR circuitry is operational within the frequency range of interest. One technique is to configure the CDR circuitry so that it can automatically lock to the incoming frequency, such as by including a phase lock loop (PLL) circuit. In an alternative embodiment, the CDR circuitry can be configured such that a plurality of narrower frequency bands are provided to choose from. When the data stream received by the multi-protocol framer from the CDR circuitry does not provide any usable information, the framer, in accordance with the present invention, may be configured to initiate a frequency band change in the CDR circuitry to enable the CDR circuitry to lock to the incoming frequency, as will be understood by those skilled in the art. This procedure can be repeated until the framer detects a valid framing sequence for one of the supported protocols in the data stream.

Figure 5:
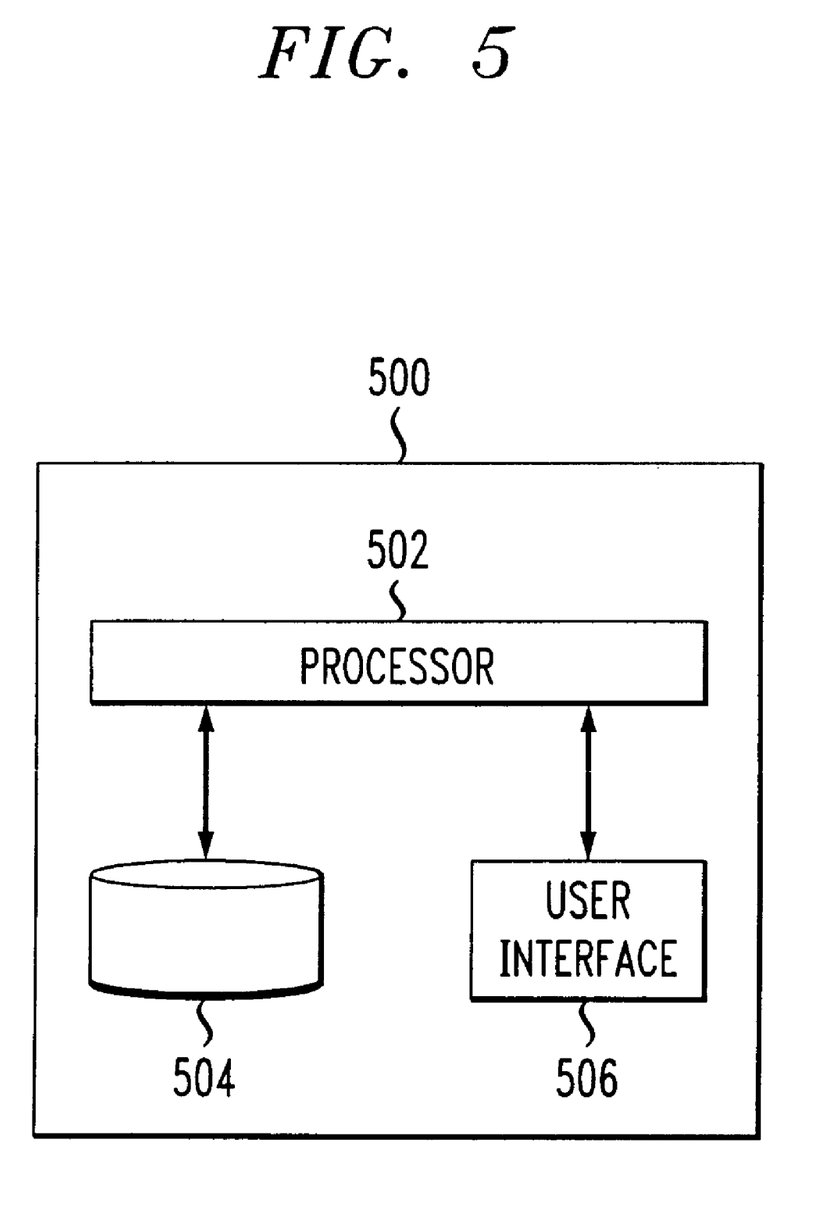
FIG. 5 is a block diagram illustrating a generalized data processing system for implementing the methodologies of the present invention.

As shown in FIG. 5, the multi-protocol agile framer of the present invention described herein may be implemented, in whole or in part, in accordance with a processing system 500, including a controller or processor 502, memory 504 and a user interface 506. It is to be appreciated that the term "processor" as used herein is intended to include any processing device, such as, for example, one that includes a central processing unit (CPU) and/or other processing circuitry (e.g., digital signal processor (DSP), microprocessor, controller, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "user interface" as used herein is intended to include, for example, one or more input devices (e.g., keyboard, mouse, etc.) for entering data to the processor, and/or one or more output devices (e.g., monitor, etc.) for presenting the results associated with the processor.

Accordingly, an application program, or software components thereof, including instructions or code for performing the methodologies of the present invention, may be stored in one or more of the associated storage media (e.g., ROM, fixed or removable storage) and, when ready to be utilized, loaded in whole or in part (e.g., into RAM) and executed by the processor 502. In any case, it is to be appreciated that one or more of the components shown in FIGS. 1 and 2 may be implemented in various forms of hardware, software, or combinations thereof, e.g., one or more digital signal processors (DSPs) with associated memory, application-specific integrated circuit(s), functional circuitry, etc.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A data framer capable of supporting at least two different data framing protocols potentially present in a source data stream, the data framer comprising:

a first framing circuit configured to selectively extract user data from the source data stream in accordance with a first of the at least two data framing protocols;

a second framing circuit configured to selectively extract user data from the source data stream in accordance with a second of the at least two data framing protocols; and a controller coupled to the first and at least second framing circuits, at least one of the controller, the first framing circuit and the second framing circuit being operative to: (i) receive the source data stream and automatically determine which of the at least two different data framing protocols corresponds to the source data stream; and (ii) route the source data stream to one of the first framing circuit and the second framing circuit in response to a match between the determined data framing protocol of the source data stream and one of the first and second data framing protocols;

wherein each of the framing circuits comprises at least one state machine, the at least one state machine being configured to receive the source data stream and determine whether the data framing protocol corresponding to the source data stream substantially matches a data framing protocol associated therewith, each of the at least one state machine including a different respective data framing protocol corresponding thereto;

wherein each of the state machines associated with the framing circuits are configured to determine the data framing protocol corresponding to the source data stream substantially concurrently.

2. The data framer of claim 1, wherein:

the first data framing protocol is a wide area network (WAN) protocol; and the second data framing protocol is a local area network (LAN) protocol.

3. The data framer of claim 1, wherein:

the first data framing protocol is a synchronous optical network (SONET)/synchronous digital hierarchy (SDH) protocol; and the second data framing protocol is one of an Ethernet protocol and a Fibre Channel protocol.

4. A data framer capable of supporting at least two different data framing protocols potentially present in a source data stream, the data framer comprising:

a first framing circuit configured to selectively extract user data from the source data stream in accordance with a first of the at least two data framing protocols;

a second framing circuit configured to selectively extract user data from the source data stream in accordance with a second of the at least two data framing protocols; and a controller coupled to the first and at least second framing circuits, at least one of the controller, the first framing circuit and the second framing circuit being operative to: (i) receive the source data stream and automatically determine which of the at least two different data framing protocols corresponds to the source data stream; and (ii) route the source data stream to one of the first framing circuit and the second framing circuit in response to a match between the determined data framing protocol of the source data stream and one of the first and second data framing protocols;

wherein each of the framing circuits comprises at least one state machine, the at least one state machine being configured to receive the source data stream and determine whether the data framing protocol corresponding to the source data stream substantially matches a data framing protocol associated therewith, each of the at least one state machine including a different respective data framing protocol corresponding thereto;

wherein the controller is configured to operatively disable one or more state machines associated with data framing protocols not matching the determined data framing protocol corresponding to the source data stream.

5. A data framer capable of supporting at least two different data framing protocols potentially present in a source data stream, the data framer comprising:

a first framing circuit configured to selectively extract user data from the source data stream in accordance with a first of the at least two data framing protocols;

a second framing circuit configured to selectively extract user data from the source data stream in accordance with a second of the at least two data framing protocols;

a controller coupled to the first and at least second framing circuits, at least one of the controller, the first framing circuit and the second framing circuit being operative to: (i) receive the source data stream and automatically determine which of the at least two different data framing protocols corresponds to the source data stream; and (ii) route the source data stream to one of the first framing circuit and the second framing circuit in response to a match between the determined data framing protocol of the source data stream and one of the first and second data framing protocols; and a scrambler/descrambler operatively coupled between the controller and at least one of the first framing circuit and the second framing circuit, the scrambler/descrambler, in a first mode of operation, being configured to selectively insert predetermined bit transitions into a destination data stream and, in a second mode of operation, being configured to selectively remove predetermined bit transitions from the source data stream.

6. A data framer capable of supporting at least two different data framing protocols potentially present in a source data stream, the data framer comprising:

a first framing circuit configured to selectively extract user data from the source data stream in accordance with a first of the at least two data framing protocols;

a second framing circuit configured to selectively extract user data from the source data stream in accordance with a second of the at least two data framing protocols; and a controller coupled to the first and at least second framing circuits, at least one of the controller, the first framing circuit and the second framing circuit being operative to: (i) receive the source data stream and automatically determine which of the at least two different data framing protocols corresponds to the source data stream; and (ii) route the source data stream to one of the first framing circuit and the second framing circuit in response to a match between the determined data framing protocol of the source data stream and one of the first and second data framing protocols;

wherein the controller is further operative to: (iii) detect the status of at least one of the framing circuits, the at least one framing circuit monitoring the source data stream for expected frame boundaries corresponding to the determined data framing protocol of the source data stream; and (iv) automatically determine a new data framing protocol corresponding to the source data stream when the expected frame boundaries do not substantially match frame boundaries corresponding to the monitored source data stream.

7. The data framer of claim 6, wherein the controller is further operative to automatically determine a new data framing protocol corresponding to the source data stream when the expected frame boundaries do not substantially match frame boundaries corresponding to the monitored source data stream for a predetermined number of consecutive frames of the source data stream.

8. A data framer capable of supporting at least two different data framing protocols potentially present in a source data stream, the data framer comprising:

a first framing circuit configured to selectively extract user data from the source data stream in accordance with a first of the at least two data framing protocols;

a second framing circuit configured to selectively extract user data from the source data stream in accordance with a second of the at least two data framing protocols; and a controller coupled to the first and at least second framing circuits, at least one of the controller, the first framing circuit and the second framing circuit being operative to: (i) receive the source data stream and automatically determine which of the at least two different data framing protocols corresponds to the source data stream; and (ii) route the source data stream to one of the first framing circuit and the second framing circuit in response to a match between the determined data framing protocol of the source data stream and one of the first and second data framing protocols;

wherein the controller is additionally configured to change a data framing protocol of the data framer in response to a user-selectable control signal presented to the data framer.

9. A method of transferring data between a source and a destination, the method comprising the steps of:

receiving an input data stream from the source;

automatically determining a data framing protocol corresponding to the input data stream from at least two data framing protocols potentially present in the input data stream;

in a first mode of operation, extracting data from the input data stream in accordance with the determined data framing protocol corresponding to the input data stream;

in a second mode of operation, framing data from the destination in accordance with the determined data framing protocol corresponding to the input data stream;

monitoring the input data stream for expected frame boundaries corresponding to the determined data framing protocol of the input data stream; and automatically determining a new data framing protocol corresponding to the input data stream when the expected frame boundaries do not substantially match frame boundaries corresponding to the monitored input data stream.

10. The method of claim 9, wherein the step of automatically determining the new data framing protocol comprises automatically determining a new data framing protocol corresponding to the input data stream when the expected frame boundaries do not substantially match frame boundaries corresponding to the monitored input data stream for a predetermined number of consecutive frames of the input data stream.

11. The method of claim 9, wherein a first of the data framing protocols is a wide area network (WAN) protocol and a second of the data framing protocols is a local area network (LAN) protocol.

12. The method of claim 9, wherein a first of the data framing protocols is a synchronous optical network (SONET)/synchronous digital hierarchy (SDH) protocol and a second of the data framing protocols is one of an Ethernet protocol and a Fibre Channel protocol.

13. A method of transferring data between a source and a destination, the method comprising the steps of:

receiving an input data stream from the source;

automatically determining a data framing protocol corresponding to the input data stream from at least two data framing protocols potentially present in the input data stream;

in a first mode of operation, extracting data from the input data stream in accordance with the determined data framing protocol corresponding to the input data stream;

in a second mode of operation, framing data from the destination in accordance with the determined data framing protocol corresponding to the input data stream;

in a first mode of operation, selectively inserting one or more predetermined bit transitions into an output data stream; and in a second mode of operation, selectively removing one or more predetermined bit transitions from the input data stream.

14. Apparatus for transferring data between a source and a destination, the apparatus being capable of supporting at least two different data framing protocols potentially present in a source data stream, the apparatus comprising:

at least one processor being operative to: (i) receive the source data stream; (ii) automatically determine a data framing protocol corresponding to the source data stream; (iii) in a first mode of operation, extract data from the source data stream in accordance with the determined data framing protocol corresponding to the source data stream; (iv) in a second mode of operation, frame data from the destination in accordance with the determined data framing protocol corresponding to the source data stream; (v) monitor the source data stream for expected frame boundaries corresponding to the determined data framing protocol of the source data stream; and (vi) automatically determine a new data framing protocol corresponding to the source data stream when the expected frame boundaries do not substantially match frame boundaries corresponding to the monitored source data stream.

15. The apparatus of claim 14, wherein the at least one processor is further operative to automatically determine a new data framing protocol corresponding to the source data stream when the expected frame boundaries do not substantially match frame boundaries corresponding to the monitored source data stream for a predetermined number of consecutive frames of the source data stream.

16. Apparatus for transferring data between a source and a destination, the apparatus being capable of supporting at least two different data framing protocols potentially present in a source data stream, the apparatus comprising:

at least one processor being operative to: (i) receive the source data stream; (ii) automatically determine a data framing protocol corresponding to the source data stream; (iii) in a first mode of operation, extract data from the source data stream in accordance with the determined data framing protocol corresponding to the source data stream; (iv) in a second mode of operation, frame data from the destination in accordance with the determined data framing protocol corresponding to the source data stream; (v) in a first mode of operation, selectively insert one or more predetermined bit transitions into a destination data stream; and (vi) in a second mode of operation, selectively remove one or more predetermined bit transitions from the source data stream.

* * * * *